United States Patent [19]

Theml

[11] 3,771,679
[45] Nov. 13, 1973

[54] METHOD FOR FILLING ORDERS WITH A SORTING CONVEYOR

[75] Inventor: Horst Theml, Klein Ostheim, Germany

[73] Assignee: Licentia Patent-Verwaltungs G.m.b.H., Frankfurt, Germany

[22] Filed: Nov. 30, 1971

[21] Appl. No.: 203,315

Related U.S. Application Data

[63] Continuation-in-part of Ser. No. 802,938, Feb. 27, 1969, abandoned.

[30] Foreign Application Priority Data

Feb. 27, 1968 Germany................. P 15 56 616.2

[52] U.S. Cl. ............................ 214/152, 214/16 B
[51] Int. Cl. .............................................. B65g 1/04
[58] Field of Search ..................... 214/152, 16 B; 141/100–105

[56] References Cited
UNITED STATES PATENTS

| 1,832,547 | 11/1931 | Hall | 186/1 |
| 2,096,959 | 10/1937 | Cleic | 186/1 |
| 2,856,743 | 10/1958 | Schickendenz et al. | 186/1.2 X |
| 3,093,252 | 6/1963 | Cahill | 214/16 B |
| 3,152,681 | 10/1964 | Byrnes et al. | 214/16 B X |
| 3,247,929 | 4/1966 | Langley | 214/16 B X |
| 3,448,870 | 6/1969 | Gallo et al. | 214/16 B |

FOREIGN PATENTS OR APPLICATIONS

| 425,635 | 6/1967 | Switzerland | 186/1.2 |

Primary Examiner—Gerald M. Forlenza
Assistant Examiner—R. B. Johnson
Attorney—George H. Spencer et al.

[57] ABSTRACT

An order filling method includes providing a conveyor with a series of carrier units for receiving items in a particular order, sequentially moving the carriers on the conveyor to supply locations where desired articles are available and transferring same to the carriers, changing the articles available at the supply locations, and again moving the carriers to the supply or article filling locations as often as necessary until all desired articles have been made available, and finally removing filled carriers from the sorting conveyor system.

11 Claims, 8 Drawing Figures

PATENTED NOV 13 1973
3,771,679
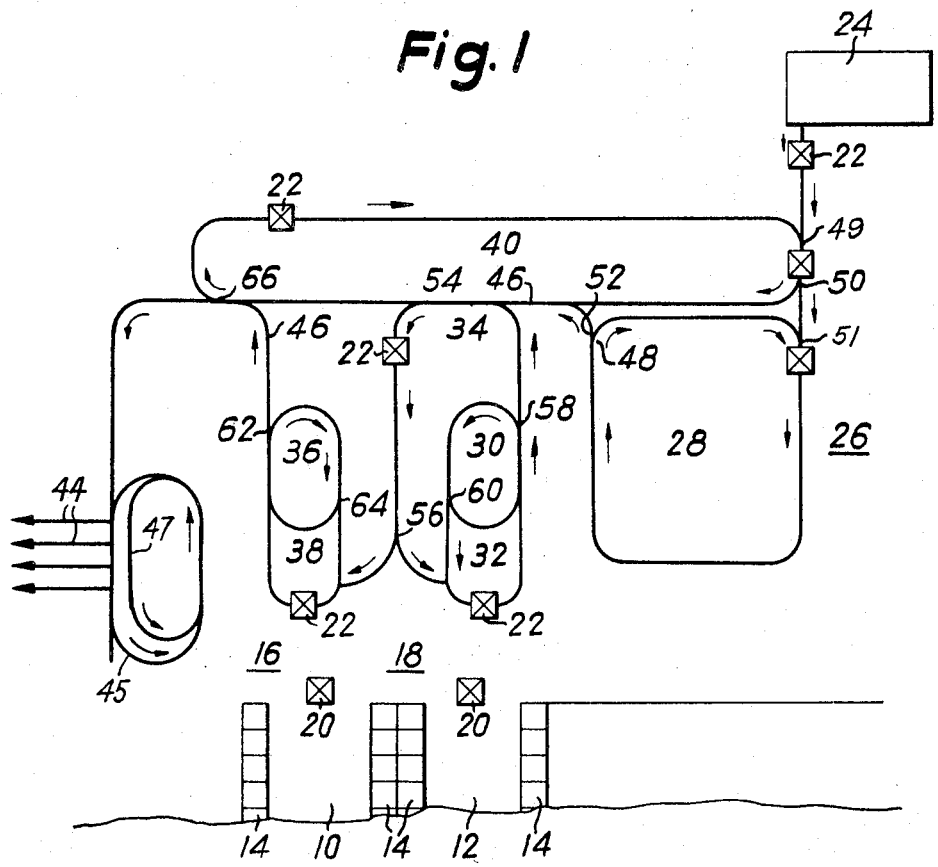
Fig. 1
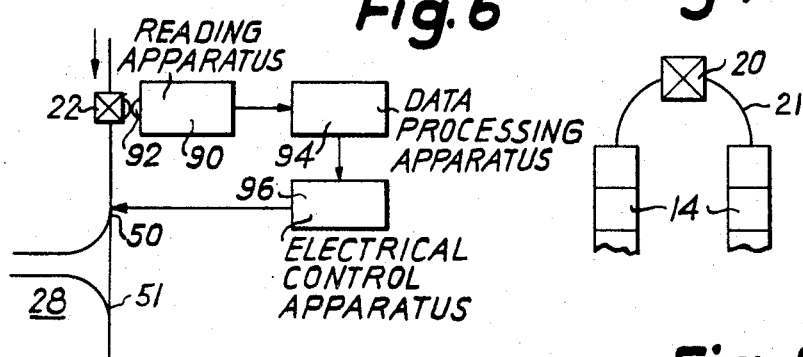
Fig. 6
Fig. 7
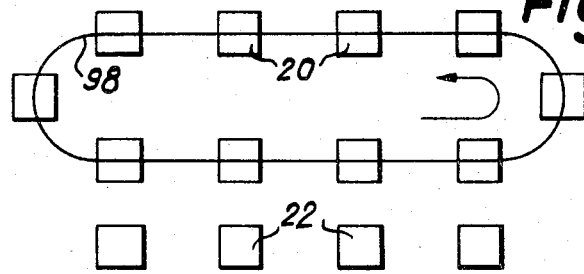
Fig. 8

3,771,679

METHOD FOR FILLING ORDERS WITH A SORTING CONVEYOR

CROSS REFERENCE TO RELATED APPLICATION

This application is a continuation-in-part of applicant's copending United States application Ser. No. 802,938, filed Feb. 27, 1969, now abandoned.

BACKGROUND OF THE INVENTION

The present invention relates to a method for filling orders with a sorting conveyor wherein individual groups of items are individually taken from separate stores and are combined into an order on a carrier such as a tray, container, cart or the like.

Such methods are employed to an increasing extent in industry and commerce for manually and automatically filling orders. This filling of orders consists of the combination of a number of items into an order. The object is here to fill orders for a plurality of different items ordered in units of larger or smaller amounts from a warehouse stock which contains any number of different items in large lots. Such individual orders consist of many different items in small lots, which might be combined, under certain circumstances, in one or a plurality of conveying units or carriers, respectively.

This method is significant, for example, for department stores and mail-order houses in which one order comprises a limited number of different items which must be selected and combined from among several thousands of items.

Previously two principally different methods for filling orders have become known which may be accomplished by means of the most varied mechanical devices.

In one known embodiment the individual items of the store are arranged in a spatially determined manner and are distributed in horizontal and/or vertical warehouse areas. The carriers for the order units, i.e., the containers, trays or the like which are to carry the individual items, are conducted along the different items and thus pass through the entire range of an arbitrary number of items. At the end of the path each carrier for one order is filled with the required articles in the required number.

Among these methods is also the filling of orders in the shelf row of a shelf store where each one of the stationary shelves for the items is approached by one or a plurality of carriers for one order unit, the required items are taken out of the shelf unit and added to the order unit carrier.

In another known method, carriers to receive the individual groups of items are stationary and each article of the warehouse store is passed by the carriers of the order-filling units and each carrier is filled with the required number of the individual groups of items.

Moreover, different variations of the two abovementioned order-filling possibilities have become known. For example, in the filling of so-called "mixed orders" one item is taken from the store supply in the required number and is then, in a second sorting process, distributed to stationary carriers for the order units or collecting tracks so that each order unit receives the required number of the desired item.

The time required in the known order-filling methods for compiling one order is still relatively long due to the unavoidable manual operations. These known processes are also limited to warehouses which are provided with only a limited number of storage compartments or storage locations in the magnitude of several thousand. The time requirement and the manual operation and thus the time required for the total compilation of an order becomes considerably larger when the number of items, i.e., the number of the storage compartments or storage locations increases, i.e., reaches a magnitude of approximately 40,000. Thus, although it is conventional in the known order filling methods to utilize a conveyor system which transports the order filling carriers to particular article filling locations whereat desired items are transferred to the order carriers either manually or automatically, when the number of items becomes particularly large it becomes impractical to provide a separate location along the conveyor system for each article.

SUMMARY OF THE INVENTION

It is the object of the present invention to provide a method for filling orders with a sorting conveyor, particularly for filling orders from a large inventory, for example, as would exist in a warehouse, which saves time and requires only very little manual efforts.

In such a method, all items are brought together once in the course of the total order-filling process with the carriers of the order units so that at the end of this one filling cycle all carriers of the order units are filled with all the desired items and in the desired number.

This is accomplished according to the present invention in that the carriers for the order units are moved past a plurality of supplies of items within range of the carriers for the duration of a filling cycle and that each carrier of the order units is filled with a predetermined number of items from the different supplies. After completion of the sorting trip, the remainder of the supplies or the empty compartments on which the supplies were held, are removed and are replaced by a new type of item and the carriers may then, if required, be directed in another filling cycle to the same supply locations. More particularly, according to the invention, a plurality of article filling locations, which is substantially less than the total number of items available in the store or warehouse, are utilized, and selected different articles are provided at each of the article filling locations. During one cycle of a series of carrier units mounted on the conveyor for the receipt of particular items comprising a particular order, each carrier which is to receive a particular article presently available at a particular article filling location is moved to the associated article filling location and the required number of articles then available are transferred thereto. Thereafter, the carrier is moved to the next article filling location at which a desired article is presently available. After each carrier unit in the series which is to receive an article presently available at an article filling location has received same, i.e., at the completion of a cycle, the article or articles available at the particular article filling locations are changed to different articles and the process of moving the carriers to the article filling locations and transferring the articles to the carriers is repeated. This sequence of operation, i.e., the changing of the articles at the article filling locations and the subsequent movement of the carriers to the associated article filling locations and transfer of articles thereto, is repeated as many times as required until such time as all of the items required to fill the orders represented by each carrier have been made available at the article filling locations, after which the filled carriers are removed from the sorting conveyor system.

The sorting conveyor may be a linear conveyor which is moved to and fro or a conveyor having a continuous path may be used. Depending on size and dimensions of the installation and on the specific requirements, individual carriers of the order unit containing a particular series of items can be cut out of the sorting conveyor and cut in again upon completion of the filling process. Alternatively, the construction can be such that the sorting conveyor with the carriers of the order units is movable as a unit and is passed by stationary supplies and subjected to one filling cycle at a time. Additionally, the arrangement can operate in such a manner that the sorting conveyor containing the groups of items is movable as a unit, is passed by stationary carriers of order units and the carriers or the order units are subjected to one filling cycle.

In large-scale installations with many movable carriers for order units it is advantageous to divide the sorting conveyor into a presorter and a number of rapid sorters wherein from all the carriers of order units available in a presorter only those carriers are moved into a particular rapid sorter which are to be filled with the items available at that rapid sorter.

For a substantially automatic accomplishment of the sorting process the carriers of the order units and/or the supplies of the different items may advantageously be provided with automatically readable markings from which the sorting and filling program or the type of item, respectively, may be directly or indirectly read out or derived, respectively. The marking may contain, for example, the item number with the number of items required and also the sequence of the filling order.

Advantageously each carrier for the orders, or each compartment for supplies, may be provided with permanently affixed code markings which are readable by associated automatic code reading apparatus. The code marking may be one of a series of fixed, consecutive numbers assigned to all carriers or all supply compartments. An electrical control mechanism, and/or a data processing system may then be used to store information concerning the items to be placed in each order, and to issue appropriate instructions for controlling the movement of carriers, supply compartments, and the filling operation.

The control and cutting-in of the carriers for the order units or the supplies of the items into the rapid sorting cycle by means of an electrical control mechanism and/or a data-processing system can be accomplished automatically in such a manner that only those units are cut in which are needed for filling the order and that those units which will no longer be needed in the subsequent sorting cycle are cut out.

BRIEF DESCRIPTION OF THE DRAWINGS

FIG. 1 illustrates schematically a preferred embodiment of the invention utilizing a conveyor having a number of continuous paths.

FIG. 6 illustrates schematically an embodiment of an automatic reading and data control system for the switches of the conveyor system.

FIG. 7 illustrates schematically an embodiment of the apparatus for moving the supply compartments.

FIG. 8 illustrates schematically an embodiment of supply compartments which are movable as a unit.

DESCRIPTION OF THE PREFERRED EMBODIMENTS

Figure 2:
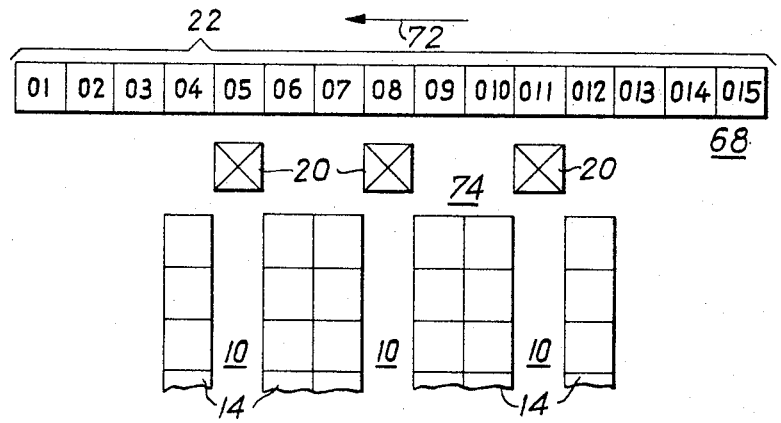
FIG. 2 illustrates schematically another embodiment of the invention utilizing a conveyor which has a back and forth movement.

As shown in FIG. 1, warehouse aisles 10, 12 are provided with associated storage compartments or storage locations 14 at both sides thereof which contain different articles or items and from which the desired or ordered items may be removed by means of suitable transporting means and removal devices, if necessary with their storage trays. Each warehouse aisle 10, 12 has an associated order-filling or article-filling location 16, 18 where, either manually or by automatic means, the transfer of the items from, e.g., a supply of these items arranged on a tray 20, to the carrier 22 of an order-filling unit in the form of a container, tray, or the like is accomplished. The carriers 22 of the order-filling units are brought to the order-filling locations 16, 18 on a conveying system 26 consisting of a plurality of units.

The carriers 22 for the orders are taken from a carrier storage area 24 where they are provided with the appropriate designations of a certain order, for example, in the form of a list. In this connection, reference is made to Table I below showing exemplary orders:

TABLE I

| Order filling unit carrier No. | Order Name | Order No. | Contents of Order |
|---|---|---|---|
| 0001 | Marsh | 4711 | 1 pair of shoes, 5 lb. sugar, 10 bags of tulip bulbs |
| 0002 | Jilly | 4712 | 3 pairs of stockings, 10 lb. flour, 3 cans sardines |
| 0003 | Gibble | 4820 | 1 hobbyhorse, 1 hammer, 3 pliers |
| 0004 | Allen | 4931 | 2 lb. rice, 2 cans of pineapple |
| 0101 | Grimaldi | 4381 | 3 pairs of trousers, 2 shirts, 1 necktie |
| 0102 | Smith | 4612 | 1 cap, 3 socks, 2 lb. salt |
| 0103 | Singh | 4782 | 1 vise, 1 set files |
| 0998 | | | |
| 0999 | | | |
| 1000 | | | |

Each of the carriers 22 receives, for example, a name or code number corresponding to a certain name and, if required, an indication of the contents of the order, i.e., indication of the catalog number and the quantity of each item desired.

The conveying device may be any suitable device. Hanging devices, containers and below-the-ground conveying devices have proven to be advantageous. The conveyor may be constructed as a chain conveyor or as a rolling belt.

The conveying device 26 consists of a plurality of conveying closed paths 28, 30, 32, 34, 36, 38 and 40. The path 28, for example, is a presorter and storage path for the carriers 22 of the order-filling units which have left the storage area 24 when the paths 30, 32, 34, 36 and 38 are filled to such an extent that they can hold no further carriers 22 of order units.

If a carrier 22 of an order unit is to be filled with a certain type of item which is available at order filling location 18 for aisle 12, this carrier 22 is brought into a path 34 and thus reaches order-filling location 18 where the carrier of the order unit is stopped, if necessary, when it is to be filled with a larger number of items from a particular group of items currently available at location 18. Stopping might not be necessary if only a single item of a group of items is to be transferred to the carrier of the order-filling unit.

In the same manner, another carrier 22 of an order-filling unit is brought to order-filling position 16. At the order-filling position 16 this carrier 22 received a certain required group of items from the warehouse aisle 10. The paths 30, 32, 34 of the order-filling position 18 are traversed by those carriers 22 of the order-filling units which must still be filled with items from warehouse aisle 12 but which may be waiting to be brought to the order-filling position 18. The same is the case for the carriers 22 of the order-filling units of order-filling position 16 which circulate in the paths 36, 38 until those groups of items in warehouse aisle 10 are brought to the order-filling position 16 with which the carriers 22 of the order-filling units circulating in paths 36, 38 must still be filled.

When the paths 28, 30, 32, 34, 36, 38 are filled to their limits, carriers 22 which cannot be filled immediately, are sent to an "overflow" path 40 and there circulate, if necessary with the aid of the presorting path 28 or only part of the presorter 28. The carriers 22 circulating in the overflow path 40 are gradually brought back to the order-filling positions 16 and 18, respectively, and are there filled with the available items intended for the order-filling units of these carriers 22. If a carrier is completely filled with the items required for the filling of one order, this carrier 22 is brought to shipping locations 44 where the order is loaded onto vehicles or other means of transportation.

As shown in FIG. 1, the carriers 22 can be brought directly to the shipping locations 44. Preferably, however, as illustrated, the conveyor system is advantageously provided with additional collecting and sorting paths 45, 47 at the shipping locations 44. These additional collecting and sorting paths 45, 47 are of importance when there are a smaller number of shipping points or locations 44 than there are orders which must be filled.

For example, let it be assumed that the order filling system of a shipping warehouse as shown in FIG. 1 serves to supply a number of branch stores of a commercial chain. In such a case it is possible, for example, that one thousand carriers 22 are rotating in the conveyor system for the purpose of supplying 100 branch stores. With such a situation, it is possible only with a very large amount of space, to provide one hundred shipping stations 44, i.e., one for each branch store. Moreover, the removal of the carriers 22 containing orders for the different branch stores from the main portion of the sorting conveyor will not all occur during the same part of the day, but rather it will be spaced out over the entire day depending on the frequency with which the items are available at the various order filling locations, are changed which may, for example, be every two hours in a large system. Thus, it is possible that a number of filled carriers with certain orders accumulate at the shipping stations 44 and cannot be discharged, for example, to a vehicle. In this case, carriers 22 which are not immediately discharged are brought into the collecting and storing cycles 45 and 47 and are there held ready on call. If one or a plurality of the shipping stations 44 beocme available, the carriers with the waiting order are called out and guided to the free station(s) 44. The other carriers 22 remain in the collecting and storing cycles 45, 47 until they are called out. The free or emptied carriers 22 are then returned to the input store 24.

At the points at which the individual closed paths 28 to 40 are in communication with other closed paths either directly or via connecting paths, e.g., 46, 46', switches or cut-in and cut-out devices 48, 49, 50, 51, 52, 54, 56, 58, 60, 62, 64 and 66 are provided.

The switches may be operated manually; the indication for operation of the switch or for the direction in which the carrier of one order-filling unit must travel, being contained in the code or, respectively, the name of the order.

More advantageous than manually operating the switches, which requires the appropriate personnel, is automatic operation of the switches by code numbers or code data, respectively, associated with each carrier 22 for an order-filling unit which determines the path over which each carrier must travel.

It is, however, also possible to provide the carriers of the order-filling units with continuous code numbers. These code numbers are of such a type that they may be automatically read. In this way it is possible to program the entire system starting from the supply area 24 in such a way that the appropriate carriers of the order-filling units are brought to the order-filling positions 16, 18 in a prescribed timing which timing or cycle or period of stay of the individual carriers 22 at the order-filling positions 16, 18 is determined by the number of items to be processed.

Instead of the illustrated closed paths 28, 30, 32...40 it is also possible to use more such paths in larger installations or a lesser number for smaller installations.

For reasons of clarity only two warehouse aisles 10, 12 are shown in FIG. 1. Depending on the size of the installation, correspondingly more warehouse aisles, e.g., 20 or 30, with correspondingly more order-filling positions 16, 18 and a correspondingly larger number of closed paths may be provided.

Instead of the warehouse aisles 10, 12 with storage compartments 14 it is also possible to use known pass-through and rotating shelves. These pass-through or rotating shelves contain the appropriate storage compartments from which the respective items are taken in the required number at the order-filling positions 16, 18 and are placed into carriers 22.

In FIG. 7 an embodiment of the apparatus for moving the supply compartments to the order-filling locations is illustrated. As indicated the trays 20, of which only one is shown, are moved through the aisle, e.g., by means of a track 21. They are stopped at the appropriate storage location and filled with the desired items. This filling, depending on the kind and shape of the item to be transferred to the tray 20, may also be carried out without stopping the movement of the tray 20.

Table 1 shows a list which is suited for manual operation of such a sorting system. It serves as the bill of lading for carrier 22 of the respective order-filling unit and gives the operating personnel at the switches 48, 49, 50,51,52,54,56,58,60,62, 64 and 66 an indication for the selection of the switch-setting order in that it is determined at each switch whether carriers of the order-filling units are to be cut in or out of a certain sorting cycle.

This very expensive manually operated setting of the switches 50 to 66 is indicated only to explain the mode of operation. Advisably, the switches 48 to 66 are operated be an electrical control mechanism or a data-processing device. In this case, a code number, for example, is permanently stored in the memory of the control mechanism (not shown) for each carrier 22 of an order-filling unit. These code numbers which correspond, for example, to a consecutive numbering, are permanently assigned to the carriers 22 of the order-filling units in the storage area 24 or directly after leaving it corresponding to the data in the list of Table 1. After reading the code number, these data are available, either in their entirety or as parts thereof, for control purposes, i.e., the individual data which represent the order number and the size of the order, are stored in the control mechanism for each carrier of an order-filling unit. The switches are automatically controlled in accordance with the items which are available at the order-filling positions 16, 18.

Automatically operating code reading positions are provided at switches 48 to 66 with which the code numbers for the carriers 22 of the order-filling units can be read out. These items of information are fed into the electronic store mechanism and are compared with the respective stored data list. From this comparison the switch-setting order is derived and the appropriate switch-setting order is given.

FIG. 6 shows an automatic switch control apparatus wherein carrier 22 of an order-filling unit passes by the reading apparatus 90, which reads the indication on the carrier 22 such as the catalog number and the quantity of each item desired. The respective data picked up from the carrier 22 at the reading station 92 is fed into the data processing apparatus 94 which may, for example, be a computer which stores information relating to the various articles available at the various article filling locations. After having been processed and converted into a signal distinctive for the respective switches 48 to 66 to be actuated, the data is fed to the electrical control apparatus 96. The output of apparatus 96 controls the different switches 48 to 66 inclusive, of the system, for instance the switch 50 as indicated, to guide the carrier 22 either to the presorting path 28 or immediately to the different paths, to be filled with the desired items. The automatic code reading apparatus and control arrangement may be constructed in a manner well known in the art and the details thereof form no part of the present invention.

Instead of the arrangement shown in FIG. 1 in which the carriers 22 of the order-filling units are moved to the order-filling positions 16, 18, by means of a conveyor system having a plurality of separate closed conveying paths, it is possible, if only a limited number of orders are involved, which have to be filled with different items, to use as the sorting conveyor a linear conveyor with a to-and-fro movement. Such an arrangement is shown in FIG. 2. The linear conveyor 68 contains a plurality of carriers 22 which are identified by number 01 to 015. The carriers 22 of the linear conveyor 68 are filled in a first filling cycle when moved in the direction indicated by the arrow 70, with the items available on the trays 20 from aisles 10 which are placed into the carriers 22 in the desired number as given in the list of Table 1.

Thereafter, the items available on the trays 20 are changed, and in the second filling cycle — in which the sorting conveyor 68 is moved in the direction indicated by arrow 72 — the carriers 22 are filled with the new group of items as desired. The sorting conveyor 68 is advantageously moved in steps during the two filling cycles in such a manner that all carriers 22 pass by the transfer point of the order-filling position 74, respectively.

When all carriers are filled with the orders, the conveyor 68 is moved away, for example, in order to remove the orders therefrom and is replaced by a new conveyor containing carriers yet to be filled.

Figure 3:
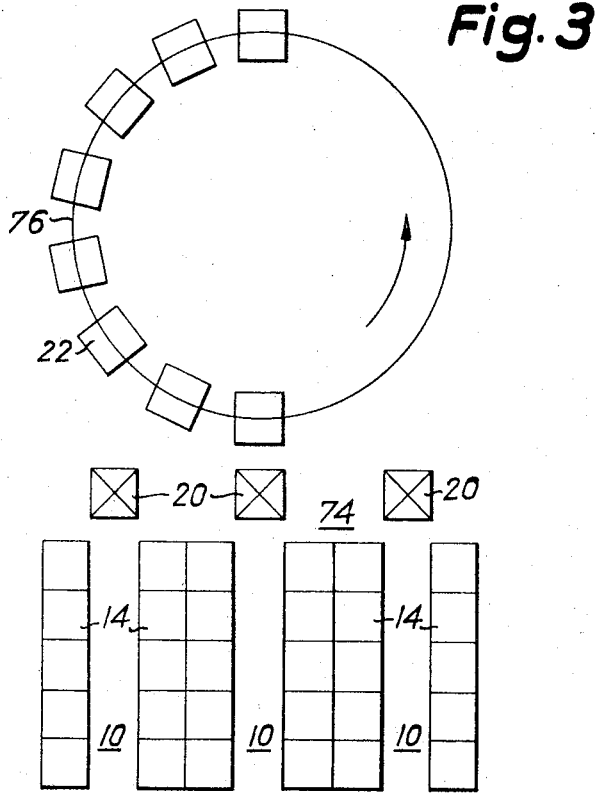
FIG. 3 illustrates schematically still another embodiment of the invention utilizing a circular conveyor.

Instead of using a to-and-fro conveyor, it is possible, as shown in FIG. 3, to use a circular conveyor in which all carriers 22 of the order-filling units circulate in one direction and pass by the order-filling position 74, of which there might be a plurality for different groups of items.

Similarly as in the arrangement of FIG. 2, the orders in the carriers 22 are removed at a discharge point when filling of carriers 22 has been completed. The carriers 22 are here also moved advantageously in steps and it is also possible here, similar to the arrangement of FIG. 2, to leave out individual carriers 22 which do not require filling with the available group of items.

Figure 4:
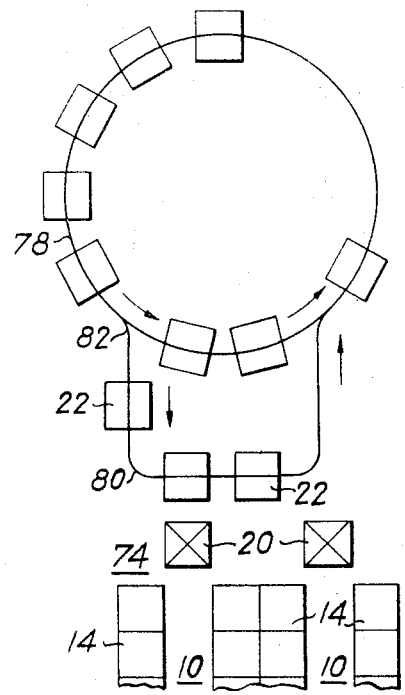
FIG. 4 illustrates schematically still another embodiment of the invention utilizing a circular conveyor and a separate conveyor path.

Filling of the carriers 22 with the desired items, and removal of the completely filled orders in a continuous and separate manner, is also possible as shown in FIG. 4. The circular conveyor 78 on which the carriers 22 are continuously moved, is provided with an additional path 80 which passes the carriers 22 by the order-filling position. A switch 82 is here provided by means of which the carriers 22 are cut into the additional path 80 whenever the supplies required for filling of the particular orders, are available at the trays 20 of the order-filling positions.

Removal of the orders from the carriers 22 or of a carrier 22 used as a shipping container may occur for example, at the discharge point marked 84.

In order to shorten the fill time for a carrier 22, the arrangement of the circular conveyor 78 as well as the additional path 80 shown in FIG. 4 may be constructed to be movable to and fro so that the carrier 22 which is to be filled with the groups of items passes by a plurality of order-filling positions 74.

Figure 5:
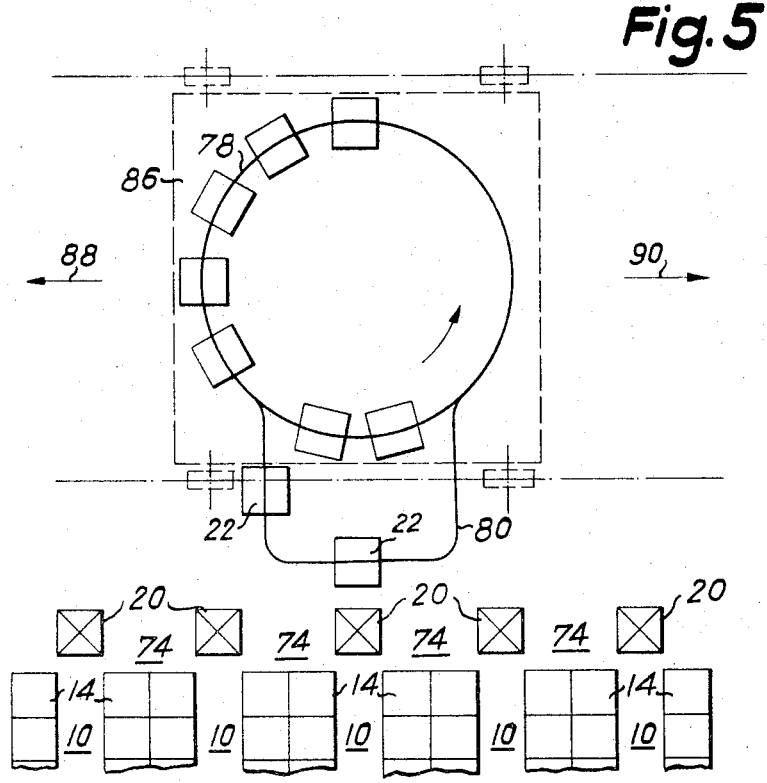
FIG. 5 illustrates schematically an embodiment of the invention in which a conveyor somewhat similar to tht of FIG. 4 is mounted on a movable platform.

This is shown in FIG. 5. The sorting conveyor 78 with the additional path 80 is arranged on a platform 86 which is moved, for example, for the first filling cycle in the direction indicated by arrow 88 and for the second filling cycle in the direction indicated by arrow 90, the carrier 22 available for filling passing by all order-filling positions 74 and being filled with their respective groups of items as desired.

FIG. 8 illustrates schematically an embodiment of supply compartments of an aisle, e.g., aisle 10 of FIG. 1 which are movable as a unit. The reference numeral 98 indicates a further sorting conveyor, which carries a plurality of supply trays 20, containing the different items along a series of carrier-order-filling units 22. The conveyor 98 may run continually or step by step. During the movement of conveyor 98 or when stopped, according to the number, size, and shape of the items to be transferred, the respective items of the desired number are transferred, from the trays 20 to the carrier-order-filling units 22. The transfer of the items from the trays 20 to the carrier-order-filling units may either be accomplished manually or automatically. In case the carrier-order-filling units 22 have been filled with the desired number of the items, they are removed, e.g., by the conveyor system of FIG. 1 and replaced by another carrier-order filling unit or another series of carrier-order-filling unit, which thereupon are filled with the respective items. This cycle may be repeated according to demand.

The present invention thus makes possible a chronologically shortened and economical filling of the carriers of order-filling units with the desired groups of items in any desired number. It is employed, for example, in mail-order houses and central warehouses for supplying a multitude of branch establishments.

It will be understood that the above description of the present application is susceptible to various modifications, changes and adaptations and the same are intended to be comprehended within the meaning and range of equivalents of the appended claims.

I claim:

1. A method for filling orders with a sorting conveyor system from articles available at a plurality of article filling locations, the sorting conveyor system including a conveyor having a circulating conveyor path and at least one branch conveyor path leading from the circulating conveyor path to an article filling location and returning to the circulating conveyor path, a series of carriers, mounted on the circulating conveyor path of the conveyor, for the receipt of particular articles comprising a particular order, and means for selectively switching the carriers from the circulating conveyor path to the branch conveyor path, said method comprising, in combination, the steps of:
   a. providing articles from a large store of articles to be used in filling said orders at a plurality of article filling locations, with different articles being presented at the different article filling locations;
   b. sequentially moving only those carriers in the series which are to receive a particular article presently available at a particular article filling location to each associated particular article filling location;
   c. transferring the desired articles available at said locations in the required number to said carriers;
   d. changing the articles available at said article filling locations so that articles which are different from those previously provided in step (a) are now available;
   e. repeating steps (b) and (c) until all of the items required for a particular order have been transferred to the associated carrier; and then,
   f. removing the filled carriers from the sorting conveyor system.

2. The method of claim 1 wherein said steps (d), (b) and (c) are repeated in sequence as required until all the items required for the orders have been made available at the article filling locations and transferred to the associated carriers.

3. The method of claim 1 wherein the conveyor system includes a further conveyor path leading from the circulating conveyor path to a shipping location and wherein said step of removing the filled carriers includes directly transporting the filled carriers to a shipping location.

4. The method of claim 1 wherein the conveyor system has a further conveyor path leading from the circulating conveyor path to a carrier collecting station, and wherein said step of removing the filled carriers includes transporting the filled carriers to the collecting station, sorting the filled carriers at the collecting station with regard to eventual destination, and finally, transporting the sorted filled carriers to a shipping location.

5. The method of claim 1 wherein said step of sequentially moving the carriers to receive a particular article to the associated article filling location includes the steps of: moving the selected carriers from said circulating conveyor path to the filling location via the branch conveyor path, and after transferal of the article thereto, returning the carriers to the circulating conveyor path.

6. The method of claim 5 wherein the conveyor system is mounted on a movable platform, and wherein the step of sequentially moving the carriers to an article filling location further includes the steps of moving the platform adjacent an article filling location and, after transferral of the available articles to each carrier which is to receive same, moving the conveyor system adjacent a further article filling location.

7. The method of claim 1 including the steps of: providing readable markings on the carriers of the said series of carriers; and reading said markings and controlling the movement of the carriers in accordance therewith.

8. The method of claim 1 including the steps of providing each carrier of one of said series with a distinctive readable marking which is part of a system of permanent consecutive markings assigned to all carriers in that series; reading said markings and transmitting same to a data processing system having information stored therein concerning the items to be placed in particular carriers, and which emits signals corresponding to said data; and controlling the movement and filling of designated carriers in accordance with the signals emitted by said data processing system.

9. The method of claim 8 wherein filled carriers are removed from the sorting conveyor and sent to a shipping location.

10. The method of claim 1 wherein a further conveyor having a series of supply compartments containing different articles which are movable thereon is provided at at least one of said article filling locations and including the steps of:
   holding the carriers on the sorting conveyor system stationary at said filling locations;
   moving the supply compartments on the further conveyor past the stationary carriers; and
   transferring articles to the carriers from said supply compartments.

11. The method of claim 1 wherein the sorting conveyor system has a plurality of said branch conveyor paths each associated with a different article filling location and wherein said step of sequentially moving includes moving, the selected carriers from the circulating conveyor path to a first desired article filling location via its associated branch path and, after transferral of the desired number of available articles, moving the selected carrier back to the circulating conveyor path, and then, if necessary, moving said selected carrier to a second desired article filling location via its associated branch path.

* * * * *